Feb. 15, 1966
F. E. PORAMBO
3,234,869
AUTOMATIC CRULLER MACHINE
Filed Nov. 4, 1964
2 Sheets-Sheet 1
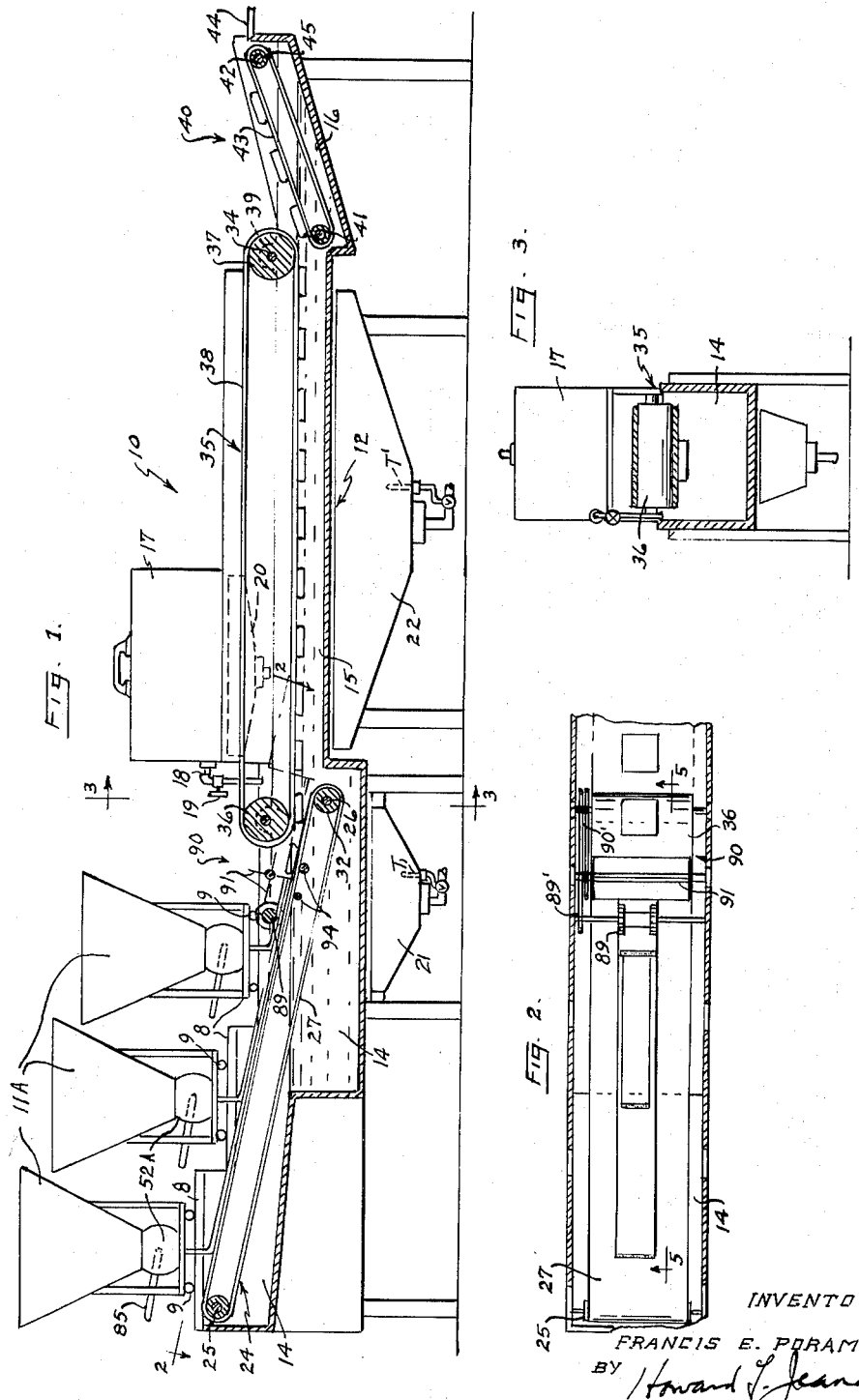
INVENTOR
FRANCIS E. PORAMBO
BY
AGENT Feb. 15, 1966     F. E. PORAMBO     3,234,869
AUTOMATIC CRULLER MACHINE
Filed Nov. 4, 1964     2 Sheets-Sheet 2
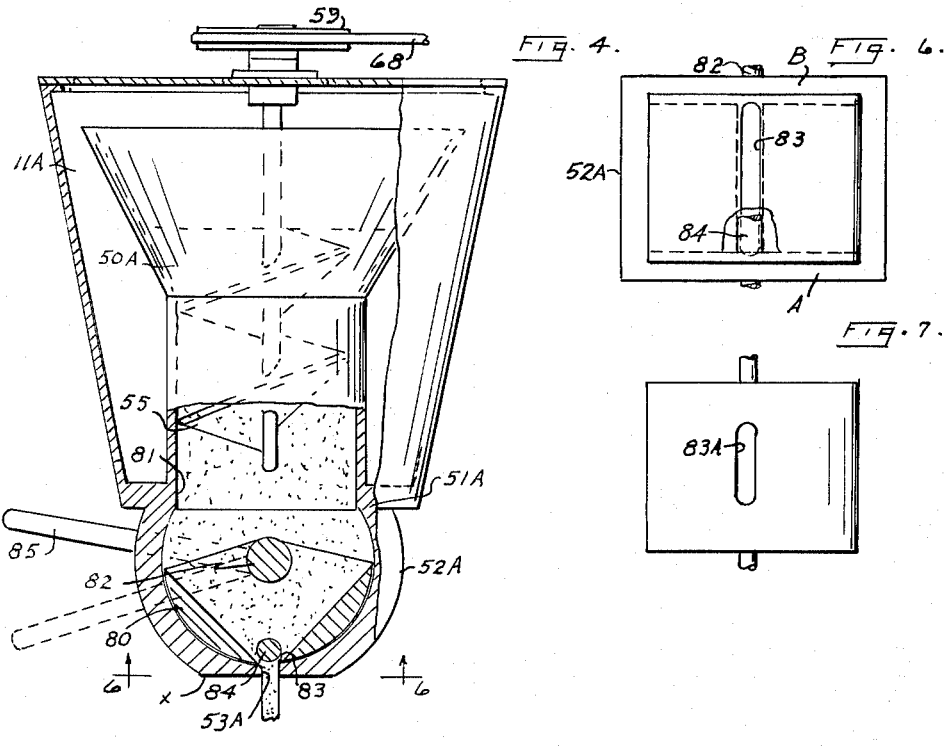
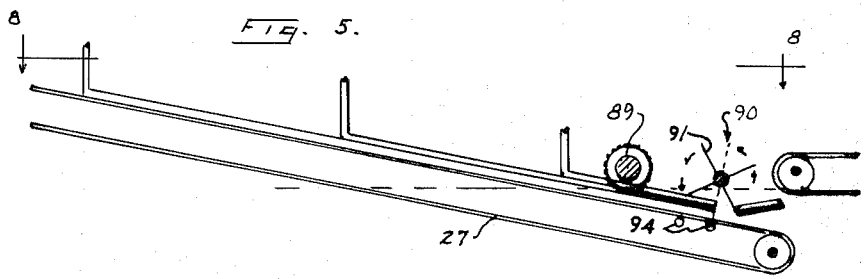
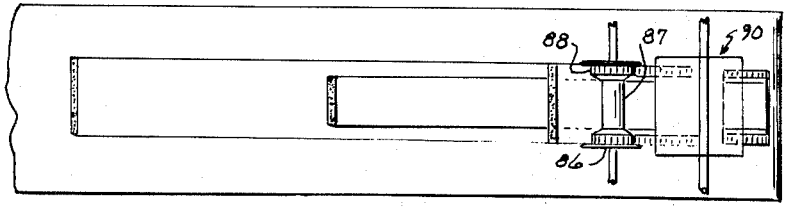
INVENTOR.
FRANCIS E. PORAMBO
BY
AGENT

United States Patent Office 3,234,869
Patented Feb. 15, 1966

3,234,869
AUTOMATIC CRULLER MACHINE
Francis E. Porambo, Elizabeth, N.J., assignor to
Franchett's Kruellers, Inc., Elizabeth, N.J.
Filed Nov. 4, 1964, Ser. No. 409,022
4 Claims. (Cl. 99—353)

This invention is related to my issued Patent Nos. 2,926,597, 3,060,837 and 3,106,151. This is a continuation-in-part of my abandoned application Serial No. 289,066.

This invention relates to an automatic cake or pie producing machine and more particularly to a series of components which transform a dough mixture into a plurality of crullers, doughnuts or pies of a particular size and shape. The cake or pie is produced in a continuous operation in which the dough is mixed and extruded in uninterrupted thin layers through exact sized throats or apertures, the layers of dough are laid upon a conveyor belt and the conveyor belt carries the layers of dough into a preheated shortening, which immediately changes the submerged dough mixture supported upon the conveyor belt into an expanding floatable partially cooked cake or pie. The layers of dough are carried by the conveyor belt into the preheated shortening and at the same time are carried into contact with a rotating cutter which separates a predetermined quantity from the layers with each cutting operation as it advances and pushes the separated portions forward and they rise to float in the liquid shortening due to their expansion as they are cooked. The separated portions are then retained at or near the surface of the liquid shortening as they are advanced by a second conveyor until they have completed their cooking cycle and the cooked cakes or pies are then carried out of the shortening by a third conveyor and thoroughly drained and ejected from the device.

It is an object of this invention to provide an automatic cake or pie forming device in which the dough mixture is automatically mixed and extruded to provide a plurality of continuous layers of a predetermined thickness of dough and in which the dough is carried into the preheated shortening and in which the partially cooked layers of dough are cut and separated into exact sized portions and carried forward at or about the surface of the shortening to finish the cooking operation and in which the completely cooked cakes or pies are removed from the shortening properly drained and ejected from the device.

It is a further object of this invention to provide an automatic cake or pie forming device in which the dough mixture is automatically mixed and extruded to provide a first layer of dough mixture, a second layer of filling and a third layer of dough mixture and in which the layers of dough and filler are carried into the preheated shortening and in which either side of the layers of dough are sealed and the partially cooked layers of dough and filler are cut and sealed and separated into exact sized portions and carried forward at or about the surface of the shortening to finish the cooking operation and in which the completely cooked cakes or pies are removed from the shortening properly drained and ejected from the device.

Other objects of this invention shall be apparent by reference to the accompanying detailed description and the drawings in which:

FIG. 1 illustrates a side elevational view of the apparatus partly in cross section, FIG. 2 illustrates a plan view taken on line 2—2 of FIG. 1, FIG. 3 illustrates an elevational view, partly in cross section, taken on line 3—3 of FIG. 1, FIG. 4 is an enlarged view partially in cross section, showing the dough feeding mechanism and the cut-off valve, FIG. 5 is an enlarged elevational view partly in cross section taken on line 5—5 of FIG. 2, FIG. 6 is a partial detail of one of the extrusion throat valves taken on line 6—6 of FIG. 4, FIG. 7 is a partial detail of another extrusion throat valve, and FIG. 8 is a plan view taken on line 8—8 of FIG. 5.

Referring to the drawings and particularly FIG. 1, there is illustrated a cruller manufacturing device 10. The device 10 includes a plurality of automatic dough feeding funnels 11A mounted on wheels 9, the wheels 9 in each case being fitted to a pair of rails 8 that form a track, thus permitting the operator to move the feeding device 11 into a feeding position or to be lifted out of position for loading. A shortening tank 12 is also provided and is divided into a deep fat cooking portion 14, a shallow fat cooking portion 15, and a fat draining portion 16. A shortening tank 17 is mounted above the tank 12. Tank 17 is connected by means of a pipe 18 with a shut-off valve 19 so that the shortening may be drained from tank 17 into tank 12 and the amount of shortening may be controlled by the valve 19. In order that the shortening in tank 17 will flow freely, a gas heater 20 may be mounted directly under tank 17. A gas heater 21 is mounted under the deep fat portion 14 of tank 12 and a gas heater 22 is mounted under the shallow fat portion 15 of tank 12. A continuous conveyor 24 is mounted in the portion 14 of tank 12. The conveyor is mounted to rotate about a pair of drums 25 and 26. It is to be noted drum 25 is mounted near the top of portion 14 so that a portion of the conveyor will actually be out of the fluid fat and that the drum 26 is mounted well below the surface of the fat. The conveyor consists of a belt 27 which may be of metal or any suitable substance which will sustain the temperature without harmful effects on the belt itself. The belt must remain flexible and durable to withstand a continuous operation. After the dough leaves the first feeding funnel 11A, it provides a layer of dough on said conveyor belt. A second funnel 11A may be provided to introduce a filler layer of less width than said first layer and a third feeding funnel may be provided to overlay the filler with a layer of dough. The multiple layers lay on the conveyor 24 before entering the fluid fat or shortening. A roller 89 is positioned over the multiple layers to retain a preferred dimension between the roller and the conveyor belt to insure a uniformity in the thickness of the extruded layers to form a pie or cake. Roller 89 is supported on either side similar to the cutter 90 and is driven by a belt or chain 89' from drum 36". Roller 89 as illustrated in FIG. 8 is provided with enlarged ends 88 so that the central portion of the roller 87 will be of a width equal to the filler layer and the ends 89 will have a greater diameter than the central roller 87 and ends 88 will bear upon the extruded dough layers to compress and insure a sealing of these layers to retain the filler layer completely sealed within the cake or pie. The layers of dough and filler are then carried into the shortening on the conveyor 24. A rotatable cutter 90 is driven by a belt or chain 90' from drum 36" and is provided with separating blades 91 mounted above the conveyor 24 and positioned adjacent the end of the conveyor. The blades 91 are wide enough to span the width of the conveyor 24 and are positioned so that the cutting or separating edge of each blade will rotate into a positive bearing relation with the upper surface of the conveyor, in fact they exert a slight pressure against the conveyor belt. In view of this slight pressure, the conveyor is provided with a pair of supporting bars 94 to maintain this positive contact with the cutter blades 91 which divide the layers of dough into successive equally sized portions which are dependent upon the spacing of the blades of the cutter and the speed of rotation. The speed of rotation will always be greater than the speed of belt or conveyor movement so that each blade as it cuts or separates the dough in addition acts as a pusher to propel the separated portions forward. The separated portions have by this time sealed their separated edges with the heated shortening and become buoyant and will start to rise in the liquid shortening, thus as the separated portions are pushed by the cutter or separating blade 91, they move forward and are picked up by the conveyor 35, which is positioned slightly above the end of conveyor 24 and is rotating so that its lower surface is at or slightly below the surface of the shortening. The separated portions of dough thus float in the shortening but bear against the conveyor belt 35 and are carried forward for the remainder of their cooking cycle. The dough as mixed to be extruded in one embodiment of this invention is preferably of a slightly fluid consistency and is therefore quite sticky and has a tendency to completely flow into one mass when poured or extruded. In this condition no blade cutter would provide any cut or separation, as the dough would reflow and unite, therefore the first layer of dough when extruded onto the conveyor 24 sticks where it is laid or poured and retains the exact definition of width. The second layer or filler must be of a width and thickness to retain its position on the first layer without overflowing either side of the layer and the third layer of dough may be wide enough to overlay the filler layer and in this embodiment will unite with the first layer of dough thus sealing in the filler layer. The thickness of each layer is controlled and the thickness of the multiple layers combined is controlled by coordinating the rate of extrusion with the speed of the conveyor and in addition a uniform thickness of the extruded layers is obtained by roller 89 positioned at the desired dimension above the conveyor belt. Roller 89 by means of its ends 88 squeezes the upper layer and lower layer of dough into a complete homogenous sealed strip on either side of the advancing layers of dough. There is no stretching due to the pull of the conveyor being too fast, nor pile up due to the speed of the conveyor being too slow. As the dough moves into the hot cooking liquid (shortening) there is a transformation, the dough loses its stickiness or tackiness, at this instant it is still very tender and is easily cut and separated. The cutter blade provides the separation and due to the transformation occurring in the dough, it will not flow and tend to rejoin. Also at this time to insure a positive separation, the cutter blade actually pushes the separated portion away from the advancing layer of dough. In order that conveyor 24 may be rotated as desired, either of the drums 25 or 26 may be used as the driving element. In this instance, drum 26 is connected through its shaft 32 which extends through the tank 12 to a reduction gear and motor (not shown) to maintain the movement of the conveyor at a predetermined speed during its operation. A second conveyor 35 is mounted above the portion 15 of tank 12 and comprises a pair of drums 36 and 37 mounted in parallel relationship at either end of the shallow portion 15. A conveyor belt 38 is mounted to rotate about drums 36 and 37, as illustrated in FIG. 1. The conveyor is mounted so that the lower surface of the conveyor belt will move and remain just slightly below the normal operating surface of the heated shortening to thus keep the partially cooked cakes below the surface of the shortening while carrying the cakes through a frictional contact with the belt through the portion 15 of tank 12 and allowing the completely cooked cakes to bob up towards the surface of the shortening liquid at the end of their travel. The conveyor 35 is driven by either of the drums 36 or 37. In this instance drum 37 is utilized, drum 37 being mounted on a shaft 34. Shaft 34 is mounted in bearings 39 at either edge of the tank and shaft 34 is connected to a reduction gear and motor (not shown) to provide a predetermined continuous speed of operation. A third conveyor 40 is provided in the portion 16 of tank 12. The conveyor consists of a pair of drums 41 and 42 with a conveyor belt 43 mounted to rotate about the drums. It is to be noted that drum 41 is mounted below the level of the shortening in the tank and slightly below the end of the second conveyor so that the cooked cakes will be ejected onto the surface of the conveyor belt 40. It is to be noted that drum 42 is mounted well above the level of the shortening so that the conveyor 40 will emerge from the fat or shortening carrying the cakes upward and allowing cakes to drain while being carried upward. A platform 44 may be mounted in juxtaposition to the conveyor belt at its highest point so that the completely cooked and drained cakes will be ejected after the cooking operation. The device has been described as including a plurality of dough feeding funnels. However this includes the use of one of the funnels to introduce a filler layer so that the filler layer may be introduced between the layers of dough to form a pie and the use of a roller to seal the filler in and the introduction of the multiple layer into the hot shortening fluid provides a searing or cooking of the outer surface for sealing of the dough to encase the filler for each individual pie as the cutter blade separates the individual pie from the layer.

A further embodiment of this invention is to permit the use of the device using one dough feeding funnel for a bottom layer and a second feeding funel for a filler and a third feeding funnel for an additional dough layer over said filler and a fourth feeding funnel for a second filler and a fifth feeding funnel for a top dough layer. In this embodiment one layer is laid upon the conveyor and the filler is overlaid on the first layer and the second layer is overlaid on the first filler and the second filler is overlaid on the second layer of dough and the third layer of dough is overlaid on the second filler. Thus a plurality of funnels may be used in which each successive layer or fill is overlaid. This permits various combinations, for example, as described in the embodiment above. There is the combination of a first layer of dough, a filler as the second layer and a layer of dough as the third layer, a second filler as the next layer and a third layer of dough as the final layer to form a pie. Further the extrusion throat valve illustrated in FIG. 6 provides a wide layer of dough to be laid upon the feeding conveyor. However the extrusion throat valve illustrated in FIG. 7 permits the extrusion of smaller layers of dough or filler to be laid upon the conveyor in parallel relationship to be advanced in the same fashion to be separated by the cutter blades in the same fashion as above described.

The device 11A is primarily a funnel 50A mounted on a base plate 51A. The base plate 51A is the upper portion of a circular housing 52A in which an oscillating valve 80 is mounted. Housing 52A is provided with a circular aperture 81 of a diameter to equal the diameter of the funnel 50A at its base. Valve 80 is pivotally mounted on a shaft 82, shaft 82 being pivotally supported in both sidewalls A and B (FIG. 6) of the housing 52A. The housing 52A, at its extruding face X, is provided with an aperture 53A. The valve 80 is formed generally with a V-shaped inner portion and a half-round outer periphery. An aperture 83 is formed at the bottom of the inner V-shape, passing through to the half-round outer periphery of the valve 80. The half-round outer periphery is of a slightly smaller diameter than the internal diameter of the circular housing 52A, so that valve 80 may be pivotally moved on shaft 82. The aperture 83 is simply an elongated slot, FIG. 6, or a smaller aperture 83A, FIG. 7, to permit the dough that is forced downward from the funnel 50A to pass through the aperture 53A in housing 52A when slots 83 or 83A are in alignment with the aperture 53A. In FIG. 4 it is to be noted that arm 85 is mounted so that the end of arm 85 may be moved manually from its full line position to its dotted line position to close the throat or aperture 53A and stop the continuous flow of the mixed dough at the end of each operation and it is understood that arm 85 will be returned to its full line position manually with the beginning of a new extruding operation. To insure a flow of dough through and toward both edges of the aperture, a rod 84 is positioned slightly above the aperture 83 as shown in FIGS. 4 and 6; thus the dough will flow around rod 84 on each side forcing itself to completely fill aperture 83 as it is extruded through the aperture. It is apparent that by controlling the valve 80 either way, the pivotal movement may be utilized to control the thickness of the flow of dough. In this particular embodiment of the invention, the desired thickness of the layer of dough may vary from a 32nd of an inch or .0312, as the most desirable minimum thickness. When laid upon the conveyor at this minimum thickness, it produces a cooked portion that is approximately ½" or .5. The desired thickness of the layer of dough may vary according to its intended use, for example, if the first layer is to be the bottom layer of a pie the thickness may be minimum. The second layer in the case of a pie may vary according to the consistency of the filler and the third layer may also be minimum as the sealing layer. In the case of a multiple cake formation, the plurality of layers may be minimum or more as desired. The reason for retaining these particular dimensions is governed by the use of the product when it is to be consumed. However the variance in thickness of the layer may be determined by the particular use desired.

The length of the aperture 83 will control the width of the single layer of dough and the aperture 83A will control the width of the filler. These apertures may be modified but the relationship between apertures shall be retained. Thus if a single line of separated portions is to be produced by the machine, the aperture may be of a desired dimension. In a further embodiment the remainder of the device must be wide enough to carry the separated portions in a plurality of cooking lines so that the cooked portions are extruded in a plurality of separate lines. With a screw arrangement 55 mounted in the funnel 50A, a pulley wheel 59 may be mounted at the top of the shaft supporting the screw 55. A belt 68 is provided to drive pulley 59, belt 68 passing to a pulley (not shown) and driven by a motor (not shown). Thus the screw 55, if driven at the proper speed, will produce the desired degree of movement of the dough through the aperture 81 into the valve housing and through the valve's V-shaped interior around the spreader rod 84 and through the slot 83 and in turn through the aperture 53A.

It is apparent, referring to FIG. 1, that the motors, namely, the motor driving the feed screw and the motors driving each of the three conveyors, may be controlled independently or may be connected to operate in unison. Either method will work satisfactorily as all of the motors are necessarily operated during the operation of this device. It is also to be noted, referring to FIG. 1, that the gas heaters may be operated separately with advantage; that is, the gas heater 20 may be first operated to change the shortening from a solid state to a fluid state and gas heater 20 may be reduced in its heat to the amount necessary to maintain the shortening in a fluid condition. Gas heaters 21 and 22 are necessarily started to maintain the shortening in a fluid condition. However, gas heater 21 and gas heater 22 may be controlled by separate thermostatic means, T and T', as it may be advantageous to maintain gas heater 21 at a higher degree of heat because it is mounted under the deep fat portion of the tank while gas heater 22 may be maintained at a different temperature being under the shallow fat portion of the tank. At any rate, a desired predetermined temperature should be maintained for the initial cooking operation and for the continuous cooking operation.

Referring to FIG. 5 there is illustrated an enlarged detail of the device illustrated in FIG. 2. In the preferred embodiment the rotating layer separating blades 91 are not utilized as a single layer of dough is extruded and laid upon the conveyor 27 but are utilized after a plurality of layers have been laid upon the conveyor 27 to be cut and separated by each blade 91 of the rotating cutter 90. It is to be noted that the uncooked dough laid upon the conveyor 27 will tend to spread. Therefore some means must be provided to provide a definite limitation on either side of the layers of dough as they enter the preheated shortening liquid. Therefore a roller 89 has been provided, the roller 89 composed of a central smaller roller 87 with each end 88 slightly larger and a cutter blade 86 affixed to each outer face of the roller at its ends 88. Thus the portions 88 will squeeze the plurality of layers of dough into a homogenous form while the blade 86 on each side will provide a separation of any excess dough or filler that might escape on either side of the cake or pie providing a standard width of cake or pie as it is advanced into the preheated shortening liquid. The preheated shortening liquid instantly affects the advancing dough to cause a searing of the exposed surfaces of the dough. At this point with the searing of the surface of the layer of dough, it is easily cut, the cut portion also sealed and thus separated. Therefore the cutter 90 is positioned at this point so that the blades 91 will have little or no resistance to the separation of the layer of dough. To insure a clean or thorough separation, the conveyor 27 is supported underneath this particular area by a pair of bars 94 so that conveyor 27 can not sag or give when the cutter blade 91 bears upon the dough and penetrates to the surface of the conveyor. In one embodiment of this invention when the dough has been separated into a desired sized portion which is predetermined by the spacing of the blades 91 in the cutter 90 and the speed of rotation with relation to the speed of movement of the conveyor 27, the size of each portion of dough is approximated. The separated portion of dough will rise in the shortening. Due to the expansion of the dough, it becomes a floating portion and lifts itself from the conveyor 27. At this point the cutter blade 91 rotating in a counter-clockwise motion (FIG. 1) will provide a pusher to move the portion of dough forward and under the next conveyor 35 where the portions of dough are carried forward to continue the cooking operation before they are picked up by the third conveyor and discharged from the apparatus.

Although the device has been disclosed as a plurality of components connected in a particular order, it is apparent that the cake or pie dough mixture may be supplied from a different type of feeding device as long as the extruding apertures are used in the same relationship without departing from the spirit of this invention and the conveyors may be changed in their size, their length, or the particular angle of mounting without departing from the spirit of this invention, and the tank provided for retaining the shortening may be changed in its shape or its length without departing from the spirit of this invention and the manner of heating this device may be any form of heat, whether gas, electric or coal, without departing from the spirit of this invention, and the particular shortening, of course, may be varied as long as it provides the necessary fluid bath for the cakes or pies during the cooking operation and the size of the extruding aperture may be changed to provide different shape and size dough portions. The layer or layers of dough will first contact the moving conveyor and be carried away from the extruding aperture or apertures so that the layer of dough will fall into a flat supported position on the conveyor. It is also to be understood that the arrangement of the dough feeding devices may be changed in their position or in their order as long as they produce an overlaid or plurality of layers of dough or dough and filler upon the conveyor similar to the process as described. It is also to be understood that the cutter or separating device may be changed to provide more or less blades and its speed of rotation may be changed to provide the desired size separation of portions with relation to the speed of the conveyor and dough being extruded and the design of the cutter whether a plurality of blades or a drum with raised portions thereon may be utilized as long as the manner of separating is the same. Also the roller 89 may be provided with a corrugated surface so that the edges of the dough that are compressed into a homogenous cake or pie will have a fluting effect as is to be found with most pies. The aforementioned variations may be provided without departing from the spirit of this invention and this invention shall be limited only by the appended claims.

What is claimed is:

1. A cake and pie cooking machine which includes a dough feeding device, said dough feeding device having a plurality of related extruding apertures to extrude dough through and provide a plurality of uncooked strips in overlapped relationship, a cooking tank filled with shortening to a predetermined level and maintained at a cooking temperature, a first conveyor system to carry the dough extruded into the cooking tank and shortening, a rotatable roller positioned over said first conveyor and above the level of the shortening so that the advancing extruded strips of dough are compressed on their edges by said roller, said roller having a greater diameter on its outer edge to seal said overlapped strips of dough, a rotating cutter with blades mounted over said first conveyor and at right angles to said first conveyor and of sufficient length so that at least one cutting edge of the blades will coact with and bear against the first conveyor below the surface of the shortening to separate portions of said dough and, seal together said edges of said strips by cooking the edges of the separated strips of dough, said cutter in turn pushing and propelling the cut and sealed portion of dough forward, a second conveyor the bottom surface of which carries the partially cooked portions of dough forward while submerged in said shortening through said tank during the cooking cycle and a third conveyor to carry the cooked cake or pie from the tank out of the shortening to eject the cake or pie from the machine, means to operate said rotating cutter, and means to maintain the shortening at a predetermined level that is above the cutting surface of the cutting blade and at least up to the bottom surface of the second conveyor in said tank.

2. A cake and pie cooking machine which includes a plurality of feeding devices positioned in sequential relation, a roller for compressing and sealing the layers of dough together and a cutter, each feeding device having an extruding aperture to extrude dough or filler and the extruding apertures controlling the width of the dough and filler extruded, a cooking tank containing shortening to a predetermined level and maintained at a cooking temperature, a first conveyor system positioned under said feeding devices to carry the extrusions forward, said extruding aperture of said first feeding device of said plurality laying a layer of dough upon said first conveyor, said extruding aperture of said second feeding device of said plurality laying a filler layer in overlapping relationship on said layer of dough and said extruding aperture of said third feeding device laying a layer of dough in overlapping relationship on said first and second layers, said extruded layers passing under said roller and carried into the cooking tank and shortening, a rotating cutter with blades mounted over said first conveyor and at right angles to said first conveyor and of sufficient length so that at least one cutting edge of the blades will coact with and bear against the first conveyor below the surface of the shortening to separate portions of said dough and, seal together said edges of said overlapped layers by cooking the edges of the separated dough layers to form a cake or pie, said cutter in turn pushing and propelling the cut portion of dough, cake or pie, forward, a second conveyor the bottom surface of which carries the partially cooked portions of dough, cake or pie forward while submerged in said shortening through said tank during the cooking cycle and a third conveyor to carry the cooked cake or pie from the tank out of the shortening to eject the cake or pie from the machine, means to operate said rotating cutter, and means to maintain the shortening at a predetermined level that is above the cutting surface of the cutting blade and at least up to the bottom surface of the second conveyor in said tank.

3. In a device according to claim 2 in which said roller is larger on each end to compress and seal the overlapped outside layers of dough into an homogenous edge of dough.

4. In a device according to claim 2 in which said first and last extruding apertures are a predetermined width for a cake or pie and said intermediate extruding aperture is of less width and positioned to feed centrally upon said first layer of dough and said apertures positioned to feed in aligned overlapped relationship.

References Cited by the Examiner

UNITED STATES PATENTS

| 1,771,506 | 7/1930 | Mustin | 107—18 X |
| 2,201,402 | 5/1940 | Knaust | 99—432 X |
| 3,106,151 | 10/1963 | Proambo | 99—353 |

FOREIGN PATENTS

| 853,732 | 10/1952 | Germany. |

CHARLES A. WILLMUTH, *Primary Examiner.*

STUART E. BECK, *Assistant Examiner.*